Figure 1:
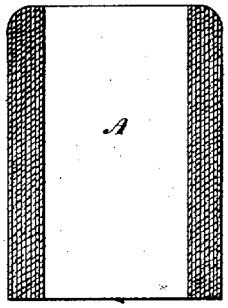

W. A. LIGHTHALL.

Packing for Steam-Condenser Tubes.

No. 6,661. Reissued Sept. 28, 1875.

Witnesses:
Henry Eichling:
B. S. Clark

Inventor:
William A. Lighthall
By J. P. Dick
his atty.

UNITED STATES PATENT OFFICE.

WILLIAM A. LIGHTHALL, OF BROOKLYN, NEW YORK.

IMPROVEMENT IN PACKINGS FOR STEAM-CONDENSER TUBES.

Specification forming part of Letters Patent No. 156,670, dated November 10, 1874; reissue No. 6,661, dated September 28, 1875; application filed August 27, 1875.

*To all whom it may concern:*

Be it known that I, WILLIAM A. LIGHTHALL, of the city of Brooklyn, in the county of Kings, State of New York, have invented a new and Improved Packing for Steam-Condenser Tubes, of which the following is a specification:

My invention relates to the formation of water and steam tight joints in tubular steam-condensers, between the tubes and the head-sheets thereof, without the use of a follower; and consists in a paper tube or hollow cylinder, formed of a continuous coil of sheet-paper, caused to adhere together by glue or some equivalent, the walls of the cylinder being consolidated by severe pressure, and such cylinder being made, when completed as a manufacture, to fit tightly the tube to be packed, and made completely to fill the annular space around the cylinder in the head-sheet, whereby may be formed, without the use of a follower, a permanently steam and water tight joint, which will permit of the movement of the tube in the packing-cylinder without displacing the packing.

There are peculiar conditions to be met in forming without a follower a permanent, satisfactory, steam-tight, yet movable, joinder of the tubes with the head-sheets in a steam-condenser, among which the following may be named: The tubes must be susceptible of longitudinal motion in the heads, to admit of their expansion and contraction with varying degrees of heat, to which in use they are subjected, as a rigid joint would result in bending the tubes or tearing them away from the head-sheets. The packing or material used to form the joint between the tube and the head-sheet must be something that will not be worn away by the above-named motion; otherwise the joint, no matter how tight it might be at first, would soon become loosened so as to leak steam and water; or there must be a compensation for such wear in the elasticity of the material. The material must be capable of bearing without injury the heat of the steam introduced into the condenser for condensation. It must be something that will not itself oxidize, and will not permit the oxidation of the tube or sheet-head at the points of contact. It must be susceptible in some degree of absorbing moisture, and thereby expanding and causing a perpetual elastic pressure against the walls of the aperture in the head-sheet on one side, and the exterior surface of the tube on the other, and it must be of such a nature and construction that the friction or adhesion between the external surface of the packing and the walls of the aperture in the head-sheet is sufficient to hold, without the use of what is known as a follower, the packing securely at rest in its seat, notwithstanding the longitudinal movement of the tube from expansion and contraction.

It is difficult to make a packing for condenser-tubes embodying all the characteristics above named, and I am not aware of any packing in use that does so. If what is denominated a follower (a device well known under that name) is used, there are many materials, such as soft metal, hemp, oakum, rubber, paper-pulp, and similar substances, by which a tight, yet movable, joint may be formed; but the first cost of the follower is very great, and while this device is one by which a joint when loose may be tightened, constant care, inspection, and frequent "tightening up" of the follower are necessary to maintain tight joints. The object of my invention is to dispense with this expensive and troublesome device (the follower) by furnishing a packing formed of paper complete in itself, by the use of which, without a follower, a permanently steam-tight, but movable, joint may be formed between the tubes and head-sheets of steam-condensers.

A special peculiarity of my new packing is that, when driven into a true cylindrical recess around the tube in a condenser-head, as hereinafter described, it will firmly adhere to the walls of the recess, and thus be retained fixedly in place, while the tube slides back and forth in the packing, as it expands and contracts by the varying degree of heat, to which, in use, the tubes are subjected, thereby obviating the necessity for making the recess of an irregular shape or employing a follower.

In carrying out my invention, I take a sheet of paper and preferably spread over one side of it a very thin covering of glue or some equivalent substance. The adhesive substance must have very little consistency, and a small quantity only be used, to the end that in the subsequent treatment of the paper it will be very completely incorporated into its substance. Thus prepared, I wind the sheet upon a mandrel the diameter of which is just equal to that of the tube for which the packing is designed. Sufficient paper should be thus wound upon the mandrel to form a tube, the external diameter of which shall be considerably greater than the diameter of the aperture in the sheet-head of the condenser, into which the said tube is designed to be packed. Unless the sheet or strip of paper used is itself of suitable width to make only a single tube of the length desired, the tube, made as above, is cut into sections of the desired length, each section constituting the packing for the end of a condenser-tube. In this condition, although the paper may have been rolled up as tightly as it is practicable to roll it by hand, the body of the cylinder formed is too soft and pervious by water to answer the purpose designed.

It is essential that it be subjected to severe pressure in order to change this condition and compact the whole and give it greater solidity. To this end I preferably place the sections upon an iron or steel mandrel of the same diameter as the interior of the sections, and force it, while upon the mandrel, through a die of suitable construction, whereby the walls of the cylinders or sections are considerably reduced in thickness, and the external diameter reduced to that of the aperture in the sheet-head of the condenser in which they are intended to be placed, thus compressing and compacting the several folds of paper together. After this compressing operation an examination will show that a substance has been formed having the peculiar characteristics hereinbefore named, which specially adapt it to the office of packing condenser-tubes—that is to say, while neither water nor steam can pass through it, it will, by contact with moisture, absorb it sufficiently to be expanded, thereby to form a tight joint in use in a steam-condenser. Parting with its absorbed water very slowly, it does not readily contract by heat in the absence of water in the condenser; it contains nothing that can contribute to the oxidation of the tubes or tube-sheets with which it is in contact; it will bear, without fracture, the percussion and swaging necessary to compact it in its seat in the sheet-head around the pipes, and when so swaged will retain permanently the shape and position thus given to it, without the use of a follower, and while permitting the tube, as it expands or contracts, to slide in the packing, will remain securely fixed in the head-sheets by adhesion to it; and, finally, it forms a packing that is cheaply and easily produced and applied.

Figure 2:
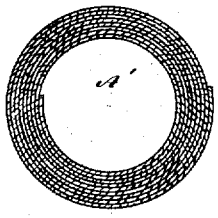
Figure 3:
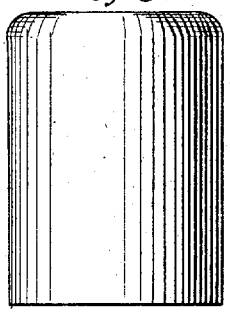
Figure 5:
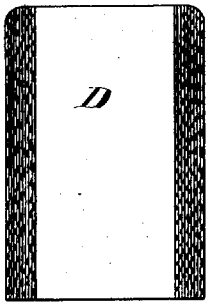
Figure 4:
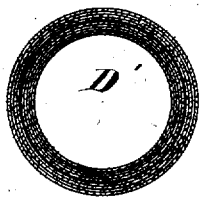
Figure 7:
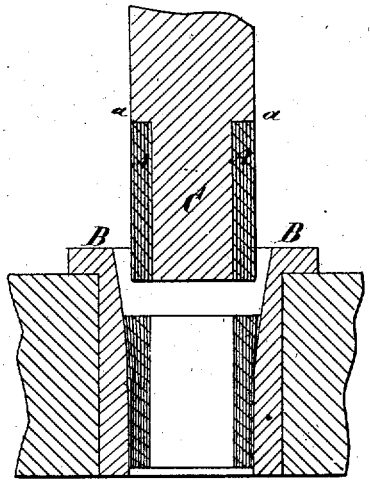
Figure 6:
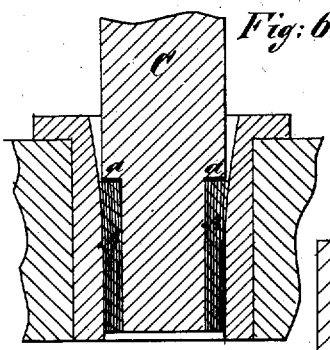
Figure 8:
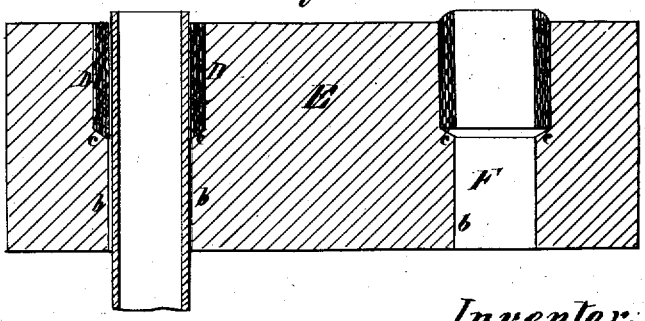

Of the drawings, Figure 1 is a central longitudinal section of the coil of paper and adhesive substance designed for my packing. Fig. 2 is a cross-section of the same. Fig. 3 is a side elevation of the same. Fig. 4 is a cross-section, and Fig. 5 a central longitudinal section, of the same coil after its walls have been compacted and consolidated by severe pressure. Fig. 6 is a vertical central section of the die and mandrel, which may be used for compressing and consolidating the said coil, showing a coil forced into the die upon the mandrel. Fig. 7 is a similar section, showing the mandrel withdrawn from the coil in the die, and having received upon it another coil in the act of descending with such coil into the die, whereby the coil already in the die will be forced through and completed. Fig. 8 is a vertical section of a sheet-head of a steam-condenser, showing two apertures for tubes, one containing the prepared paper-cylinder packing ready to receive the tube, and the other showing the tube in the paper cylinder and the cylinder swaged down to complete the joint.

A represents a vertical section, and A′ a cross-section, of the coil of paper as it has been rolled upon a mandrel. B is a die, and C a mandrel, suitable for compressing the coil A. The upper end of this die should be large enough to admit the coil, and gradually taper to the size of the aperture in the head-sheet of the condenser, as shown in the drawings. The coil of paper being placed upon the punch or mandrel C, which has a shoulder, *a*, it is forced into the die by the downward motion of the mandrel as far as the taper of the die will permit the shoulder to enter. The mandrel is then withdrawn, another coil placed upon it, which, in its descent, drives the first through the die, and so each coil being forced through by the one next following. D is a vertical section, and D′ a cross-section, of the coil after pressure in the die, and the packing is thus completed. E is a broken section of the head-sheet of a steam-condenser, showing two cylindrical apertures for tubes, one, F, with the paper cylinder D in place upon the tube G preparatory to swaging. The aperture in the head-sheet is made only very little larger than the tube G from the inner surface *b* for a small portion of its thickness—for the remaining portion the aperture being enlarged, forming a straight annular recess around the tube when the latter is in place in the head-sheet, with a shoulder, *c*, at the bottom. The paper cylinder D occupies this recess. After the completed paper cylinder is placed upon the end of the tube in the said recess, as shown in Fig. 8, I take a suitable tool—preferably an annular punch corresponding in size with the end of the said cylinder—and, by percussion, swage or upset the cylinder in its seat, so as to tighten it around the tube and against the walls of the recess, and cause it to fill completely the annular recess in the head-sheet, whereby this peculiar packing will, without a follower, be retained fixedly in the said cylindrical recess, while the tube is allowed to slide back and forth in the packing as it is contracted and expanded by varying temperature, and form a steam-tight joint between the head-sheet and tube.

What I claim as my invention, and desire to secure by Letters Patent, is—

1. As a new manufacture the compressed and consolidated cylinder D, composed of combined paper and the adhesive substance specified, formed and fitted for the packing of tubes in steam-condensers, as and for the purpose described.

2. The combination of the head-sheet E, the tube F, and the compressed and consolidated paper packing D, the recess in the head-sheet, which constitutes the seat of the packing, being truly cylindrical, and the packing, being compacted in its seat, so as to adhere to the walls of the recess and press tightly against the tube, for the purpose of forming a permanent steam-tight, yet movable, joint between the head-sheet and tube, as described.

In witness whereof I have hereunto set my hand this 18th day of August, 1875.

WM. A. LIGHTHALL.

Witnesses:
B. S. CLARK,
FRED. E. BOND.